United States Patent
Hayashi (10) Patent No.: US 9,018,880 B2
(45) Date of Patent: Apr. 28, 2015

(54) CONTROL APPARATUS FOR MULTI-PHASE ROTARY MACHINE AND ELECTRIC POWER STEERING SYSTEM USING THE SAME

(71) Applicant: Denso Corporation, Kariya, Aichi-pref. (JP)

(72) Inventor: Jiro Hayashi, Ama (JP)

(73) Assignee: Denso Corporation, Kariya (JP)

( * ) Notice: Subject to any disclaimer, the term of this patent is extended or adjusted under 35 U.S.C. 154(b) by 213 days.

(21) Appl. No.: 13/734,293

(22) Filed: Jan. 4, 2013

(65) Prior Publication Data

US 2013/0207586 A1    Aug. 15, 2013

(30) Foreign Application Priority Data

Feb. 9, 2012  (JP) ................................. 2012-026118

(51) Int. Cl.
| | | |
|---|---|---|
| *H02P 25/22* | (2006.01) | |
| *H02P 6/12* | (2006.01) | |
| *H02P 6/14* | (2006.01) | |
| *H02P 29/02* | (2006.01) | |

(52) U.S. Cl.
CPC .............. *H02P 25/22* (2013.01); *H02P 29/021* (2013.01); *H02P 29/022* (2013.01)

(58) Field of Classification Search
CPC ..... H02P 25/22; H02P 29/021; H02P 29/022; H02P 6/12; H02P 6/14; B62D 5/046; B62D 5/0484
USPC ................ 318/400.21, 400.22, 801, 490, 564
See application file for complete search history.

(56) References Cited

U.S. PATENT DOCUMENTS

| | | | | |
|---|---|---|---|---|
| 6,775,115 | B2 * | 8/2004 | Sato ................................. | 361/23 |
| 7,728,531 | B2 * | 6/2010 | Jeong ............................. | 315/291 |
| 7,839,013 | B2 * | 11/2010 | Nakamura et al. ............. | 307/9.1 |
| 7,847,495 | B2 * | 12/2010 | Oyobe et al. .................... | 318/53 |
| 7,891,451 | B2 * | 2/2011 | Oyobe et al. ............. | 180/65.275 |
| 7,948,205 | B2 * | 5/2011 | Gunji ............................ | 318/801 |

(Continued)

FOREIGN PATENT DOCUMENTS

| | | |
|---|---|---|
| JP | 01-170389 | 7/1989 |
| JP | 07-046766 | 2/1995 |
| JP | 2005-304119 | 10/2005 |

OTHER PUBLICATIONS

Office Action (1 page) dated Jan. 28, 2014 issued in corresponding Japanese Application No. 2012-026118 and English translation (2 pages).

(Continued)

*Primary Examiner* — Rita Leykin
(74) *Attorney, Agent, or Firm* — Nixon & Vanderhye PC (57) ABSTRACT

A first inverter circuit and a second inverter circuit are provided for a first winding set and a second winding set of a motor, respectively, and switch over power supply to the winding sets. A control unit controls operations of the inverter circuits. The control unit detects abnormality in the inverter circuits. The control unit calculates a first value with respect to each drive system based on phase currents of the inverter circuit in each system, calculates a second value based on two values selected from a plurality of first values calculated for each drive system, and detects abnormality of the inverter circuits, which corresponds to the selected first value, when the second value deviates from a predetermined range.

6 Claims, 7 Drawing Sheets

(56) References Cited

U.S. PATENT DOCUMENTS

| | | | |
|---|---|---|---|
| 7,952,309 B2 * | 5/2011 | Nishimura et al. | 318/400.24 |
| 8,045,301 B2 * | 10/2011 | Shiba et al. | 361/23 |
| 8,248,010 B2 * | 8/2012 | Mukai et al. | 318/400.21 |
| 8,335,603 B2 * | 12/2012 | Mitsutani et al. | 701/22 |
| 8,436,568 B2 * | 5/2013 | Mukai et al. | 318/490 |
| 8,528,689 B2 * | 9/2013 | Uryu | 180/446 |
| 8,544,593 B2 * | 10/2013 | Uryu | 180/443 |
| 8,810,179 B2 * | 8/2014 | De Wergifosse | 318/400.26 |
| 2002/0018823 A1 | 2/2002 | Ito | |
| 2011/0290580 A1 | 12/2011 | Mukai et al. | |
| 2014/0246999 A1 * | 9/2014 | Kezobo et al. | 318/400.23 |

OTHER PUBLICATIONS

Office Action (7 pages) dated Jan. 22, 2015 issued in corresponding Chinese Application No. 201210555276.7 and English translation (10 pages).

* cited by examiner

CONTROL APPARATUS FOR MULTI-PHASE ROTARY MACHINE AND ELECTRIC POWER STEERING SYSTEM USING THE SAME

CROSS REFERENCE TO RELATED APPLICATION

This application is based on and incorporates herein by reference Japanese patent application No. 2012-26118 filed on Feb. 9, 2012.

TECHNICAL FIELD

The present invention relates to a control apparatus for a multi-phase rotary machine and an electric power steering system using the same.

As one control apparatus for a multi-phase rotary machine having a plurality of winding sets, JP 2005-304119A discloses one example of such a control apparatus. This control apparatus includes an inverter circuit for each of a plurality of winding sets so that power supply to the winding set is switched over. That is, a plurality of inverter circuits is provided for the plurality of winding sets, respectively. When one of the plurality of inverter circuits fails, the power supply to the winding set by the failing inverter circuit is stopped so that the multi-phase rotary machine may be driven continuously by the other inverter circuits operating normally.

However, when an abnormality such as a short-circuit arises between two drive systems including respective inverter circuits, the abnormality cannot be detected accurately. The two inverter circuits need be stopped from operating at the same time, although each of the inverter circuits itself is not abnormal. In a case that the multi-phase rotary machine is driven by two inverter circuits, the multi-phase rotary machine cannot be driven when the two inverter circuits are stopped from operating. In a case that the multi-phase rotary machine is used as a kinetic drive power source of an electric power steering system for a vehicle, for example, a steering operation of a driver cannot be assisted when the operation of the multi-phase rotary machine is stopped.

SUMMARY

It is an object to provide a control apparatus for a multi-phase rotary machine, which is capable of accurately detecting abnormality of a plurality of drive systems including respective inverter circuits, and an electric power steering system using such a control apparatus.

According to one aspect, a control apparatus is provided for controlling driving of a multi-phase rotary machine including a plurality of winding sets, each of which is formed of coils corresponding to a plurality of phases. The control apparatus comprises a plurality of inverter circuits and a control unit. The plurality of inverter circuits are provided for the plurality of winding sets, respectively, to jointly form a plurality of drive systems. The plurality of inverter circuits switches over power supply to the winding sets. The control unit controls an operation of the inverter circuits, and includes an abnormality detection part capable of detecting abnormality of the inverter circuits.

The abnormality detection part is configured to (1) calculate a first value with respect to each inverter circuit based on phase currents of each inverter circuit, (2) calculate a second value based on two first values selected from a plurality of first values calculated in correspondence to the plurality of inverter circuits, respectively, and (3) detect abnormality between the drive systems, which correspond to the selected first values, when the second value deviates from a predetermined range.

BRIEF DESCRIPTION OF THE DRAWINGS

The above and other objects, features and advantages will become more apparent from the following detailed description made with reference to the accompanying drawings. In the drawings.

DETAILED DESCRIPTION OF EMBODIMENT

A control apparatus for a multi-phase rotary machine will be described below with reference to the drawings. Substantially the same configuration is designated by the same reference numeral among a plurality of embodiments to simplify the description.

(First Embodiment)

Figure 1:
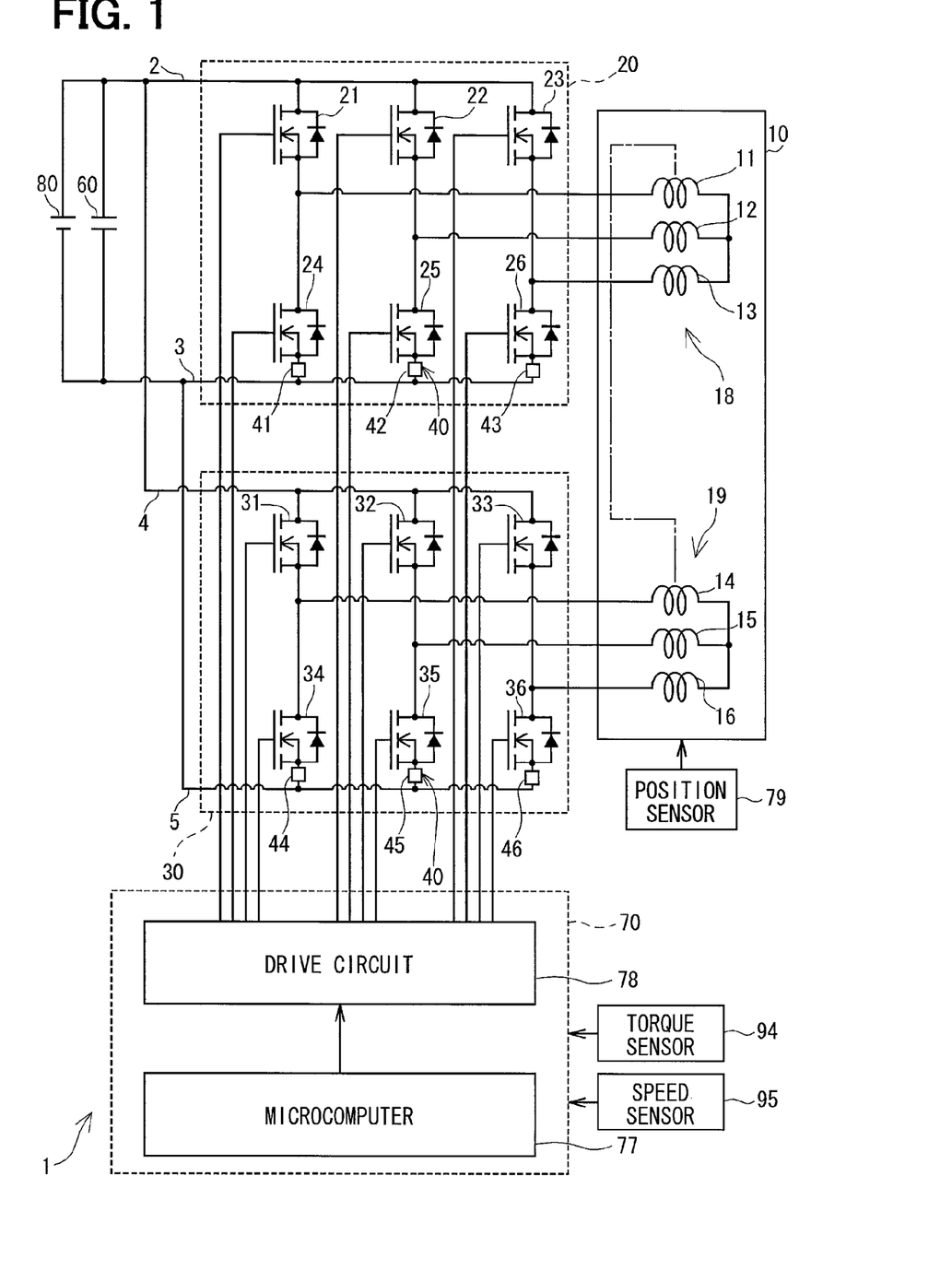
FIG. 1 is a circuit diagram showing a control apparatus for a multi-phase rotary machine according to a first embodiment.

Referring to FIG. 1, a control apparatus 1 is provided to control driving of a motor 10, which is a multi-phase rotary machine. The control apparatus 1 is used with the motor 10 as, for example, an electric power steering system, which assists a steering operation of a vehicle.

Figure 2:
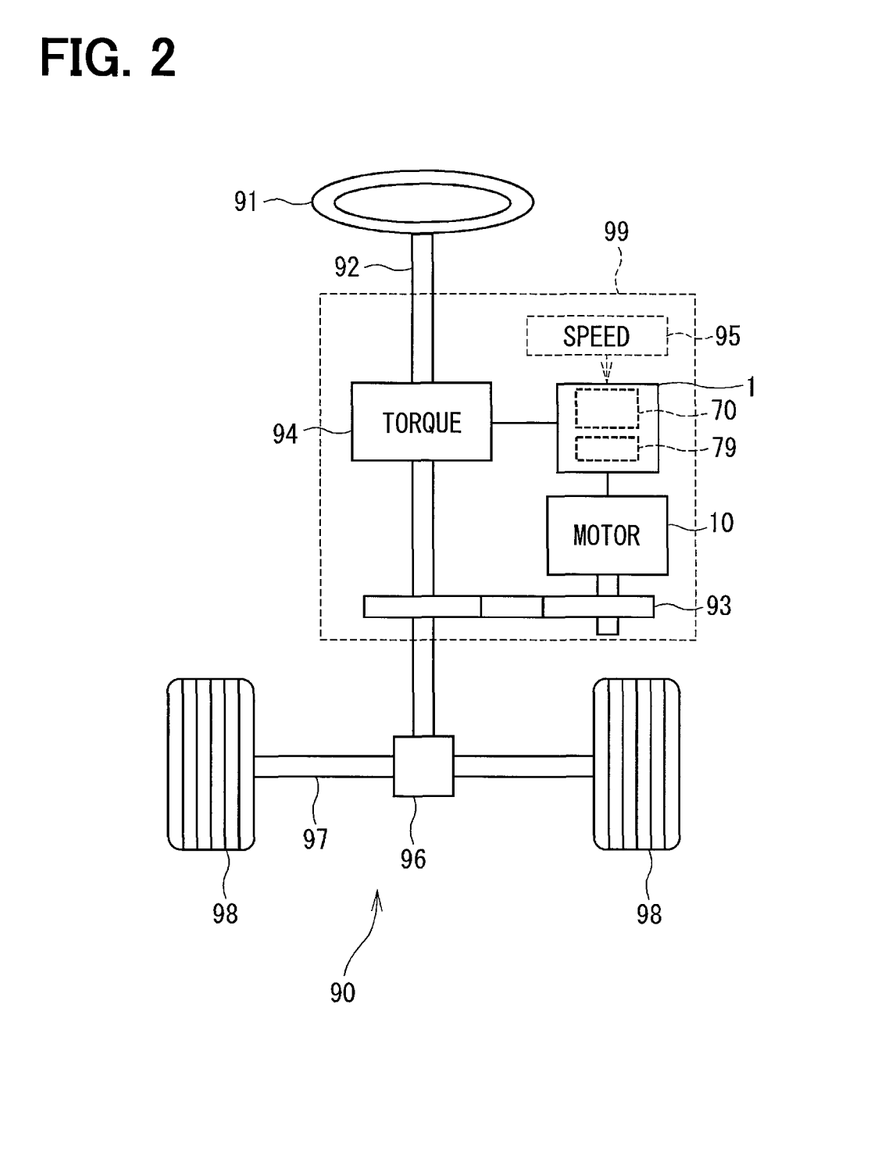
FIG. 2 is a schematic view of an electric power steering system using the control apparatus according to the first embodiment.

As shown in FIG. 2, a vehicle has a steering system 90 including an electric power steering system 99. The electric power steering system 99 includes a torque sensor 94, which is attached to a steering shaft 92 coupled to a steering wheel 91. The torque sensor 94 detects a steering torque applied to the steering shaft 92 by a driver through the steering wheel 91.

A pinion gear 96 is provided at one end of the steering shaft 92 and meshed with a rack shaft 97. A pair of vehicle wheels 98 is coupled rotatably to both ends of the rack shaft 97 through tie rods and the like. When the driver rotates the steering wheel 91, the steering shaft 92 coupled to the steering wheel 91 rotates. Rotary motion of the steering shaft 92 is converted to linear motion of the rack shaft 97 by the pinion gear 96. The pair of vehicle wheels 98 is thus steered by an angle corresponding to a distance of linear movement of the rack shaft 97.

The electric power steering system 99 includes the motor 10 for generating steering assist torque, the control apparatus 1 for controlling and driving the motor 10, a reduction gear 93 for transferring rotation of the motor 10 to the steering shaft 92 after speed reduction, and the like. The motor 10 rotates the reduction gear 93 in both normal and reverse directions. The electric power steering system 99 includes, in addition to the torque sensor 94, a vehicle seed sensor 95 for detecting a vehicle speed. The electric power steering system 99 configured as described above generates steering assist torque from the motor 10 and transfers it to the steering shaft 92 thereby to power-assist a steering operation of the steering wheel 91.

The motor 10 is a three-phase brushless motor, which has a rotor and a stator (not shown). The rotor is a cylindrical body, on a surface of which permanent magnets are fixed to provide magnetic poles. The stator houses and rotatably supports the rotor therein. The stator has salients protruding in a radially inward direction at every predetermined angular interval in a circumferential direction. Coils 11 to 16 shown in FIG. 1 are wound as windings about these salients. The coils 11 to 13 form a first winding set 18. The coils 14 to 16 similarly form a second winding set 19. The first winding set 18 and the second winding set 19 are one example of a plurality of winding sets. A position sensor 79 is provided in the motor 10 to detect a rotation position of the rotor.

The control apparatus 1 includes a first inverter circuit 20, a second inverter circuit 30, a current detection circuit 40, a capacitor 60, a control unit 70, a DC battery 80 and the like. The first inverter circuit 20 is a three-phase inverter, in which six switching elements 21 to 26 are connected in a bridge form so that power supply to each of the coils 11 to 13 in the first winding set 18 is switched over. Each of the switching elements 21 to 26 may be a MOSFET (metal-oxide-semiconductor field-effect transistor), which is one type of field-effect transistors. The switching elements 21 to 26 are referred to as FETS 21 to 26.

Three FETS 21 to 23 have drains, which are connected to a high-side power supply bus 2 connected a positive-polarity side of the battery 80. The FETS 21 to 23 have sources, which are connected to the drains of the FETS 24 to 26, respectively. The FETS 24 to 26 have sources, which are connected to a low-side power supply bus 3 connected to a negative-polarity side of the battery 80, that is, ground.

A junction between the FET 21 and the FET 24, which are connected in series between the buses 2 and 3 as a pair (that is, paired), is connected to one end of the coil 11. A junction between the FET 22 and the FET 25, which are connected in series, is connected to one end of the coil 12. A junction between the FET 23 and the FET 26, which are connected in series, is connected to one end of the coil 13.

The second inverter circuit 30 is also a three-phase inverter similar to the first inverter circuit 20. In the second inverter circuit 30, six switching elements 31 to 36 are connected in a bridge form so that power supply to each of the coils 14 to 16 in the second winding set 19 is switched over. Each of the switching elements 31 to 36 is a MOSFET similarly to the first inverter circuit 20. The switching elements 31 to 36 are referred to as FETS 31 to 36.

The three FETS 31 to 33 have drains, which are connected to a high-side power supply bus 4 connected the positive-polarity side of the battery 80. The FETS 31 to 33 have sources, which are connected to the drains of the FETS 34 to 36, respectively. The FETS 34 to 36 have sources, which are connected to a low-side power supply bus 5 connected to the negative-polarity side of the battery 80, that is, ground.

A junction between the FET 31 and the FET 34, which are connected in series, is connected to one end of the coil 14. A junction between the FET 32 and the FET 35, which are connected in series, is connected to one end of the coil 15. A junction between the FET 33 and the FET 36, which are connected in series, is connected to one end of the coil 16.

The FETS 21 to 23 are referred to as high-potential side switching elements in the first inverter circuit 20. The FETS 31 to 33 are referred to as high-potential side switching elements in the second inverter circuit 30. The FETS 24 to 26 are referred to as low-potential side switching elements in the first inverter circuit 20. The FETS 34 to 36 are referred to as low-potential side switching elements in the second inverter circuit 30. In the following description, each of the high-potential side switching element is referred to as a high FET and the low-potential side switching element is referred to as a low FET. As the case may be, the corresponding phase is also attached as exemplified U-low FET 24.

As described above, the control apparatus 1 has two power supply systems including the first inverter circuit 20 and the second inverter circuit 30. The power supply systems including the first inverter circuit 20 and the second inverter circuit 30 are referred to as the first power supply system and the second power supply system, respectively, together with the battery 80 and the capacitor 60. Further, the first power supply system and the first winding set 18 form a first drive system and the second power supply system and the second winding set 19 form a second drive system.

The current detection circuit 40 includes current detection elements 41 to 46. The current detection element 41 is provided between the U-low FET 24 and the ground to detect a current, which flows in the coil 11. The current detection element 42 is provided between the V-low FET 25 and the ground to detect a current, which flows in the coil 12. The current detection element 43 is provided between the W-low FET 26 and the ground to detect a current, which flows in the coil 13. The current detection element 44 is provided between the U-low FET 34 and the ground to detect a current, which flows in the coil 14. The current detection element 45 is provided between the V-low FET 35 and the ground to detect a current, which flows in the coil 15. The current detection element 46 is provided between the W-low FET 36 and the ground to detect a current, which flows in the coil 16.

The current detection elements 41 to 46 are shunt resistors. Detection values, which are referred to as current detection values below, outputted by the current detection elements 41 to 46 may be stored in registers (not shown) provided in the control unit 70. Signal lines from the current detection circuit 40 and the position sensor 79 to the control unit 70 are not shown to simplify illustration of FIG. 1. The capacitor 60 is connected in parallel to the battery 80, the first inverter circuit 20 and the second inverter circuit 30 to store electric charge thereby to assist power supply to the FETS 21 to 26 and FETS 31 to 36 and suppress noise components such as surge currents.

The control unit 70 is formed of a microcomputer 77, a drive circuit 78 and the like to control an overall operation of the control apparatus 1. The position sensor 79, the torque sensor 94 and the vehicle speed sensor 95 are connected to the control unit 70. Thus the control unit 70 is capable of acquiring a motor rotation position θ indicative of the rotation position of the rotor of the motor 10 detected by the position sensor 79, a steering torque Tq* detected by the torque sensor 94 and a vehicle speed Vdc detected by the vehicle speed sensor 95.

The motor 10 is controlled and driven by the following processing when the control unit 70 is normal, that is, when the control apparatus 1 is normal (no abnormality). The control unit 70 controls operations of the inverter circuits 20 and 30 in correspondence to states of drive flags provided respectively. For example, the control unit 70 drives the motor 10 by the first inverter circuit 20, when a drive flag of the first drive system is ON. On the other hand, the control unit 70 stops driving the motor 10 by the first inverter circuit 20, when the drive flag of the first drive system is OFF. Similarly, the control unit 70 drives the motor 10 by the second inverter circuit 30, when a drive flag of the second drive system is ON.

On the other hand, the control unit 70 stops driving the motor 10 by the second inverter circuit 30, when the drive flag of the second drive system is OFF. The drive flags of the first drive system and the second drive system are normally set to ON.

The operation of the first drive system, particularly the first inverter circuit 20, will be described below. A similar operation will be performed by the second drive system including the second inverter circuit 30. The control unit 70, particularly the microcomputer 77) retrieves the current detection values outputted by the current detection elements 41 to 43 and stored in the registers. The control unit 70 calculates a current value U1 of the coil 11, a current value V1 of the coil 12 and a current value W1 of the coil 13 from the current detection values. The control unit 70 then calculates a d-axis current detection value Id and a q-axis current detection value Iq based on calculated three phase currents U1, V1, W1 and the motor rotation position θ detected by the position sensor 79.

The control unit 70 calculates a d-axis command current Id* and a q-axis command current Iq* based on the motor rotation position θ acquired by the position sensor 79, the steering torque Tq acquired by the torque sensor 94 and the vehicle speed Vdc acquired by the vehicle speed sensor 95. The control unit 70 performs a current feedback control calculation to calculate a d-axis command voltage Vd* and a q-axis command voltage Vq* from the d-axis command current Id*, the q-axis command current Iq* and the d-axis current detection value Id and the q-axis current detection value Iq, which are calculated as described above.

The control unit 70 calculates a U-phase command voltage Vu*, a V-phase command voltage Vv* and a W-phase command voltage Vw*, which are three phase voltage command values, based on the calculated command values Vd*, Vq* and the motor rotation position θ. The control unit 70 calculates a U-phase duty Du, a V-phase duty Dv and a W-phase duty Dw, which are duty command signals, based on the three phase voltages Vu*, Vv*, Vw* and a capacitor voltage Vc, and stores the U-phase duty Du, the V-phase duty Dv and the W-phase duty Dw in the registers.

The drive circuit 78 compares the duty command signals and PWM reference signals and controls ON/OFF switching times of the FETS 21 to 26. By the ON/OFF control of the FETS 21 to 26 by the drive circuit 78, voltages are applied to the coils 11 to 13 of three phases (U-phase, V-phase and W-phase), respectively. Since a voltage vector continuously changes, a sinusoidal waveform voltage is applied to the coil of each phase.

When the voltage is applied to the coil of each phase, each coil 11 to 13, a current flows in correspondence to the applied voltage. Thus, the motor 10 generates a torque Tq1 by power supply through the first inverter circuit 20 of the first power supply system. The second inverter circuit 30 of the second power supply system is controlled in the similar manner as in the first inverter circuit 20. The motor 10 thus generates a sum torque, which corresponds to a sum of a first torque Tq1 generated by the operation of the first drive system including the first inverter circuit 20 and a second torque Tq2 generated by the operation of the second drive system including the second inverter circuit 30. The torque Tq is applied to the steering shaft 92 through the reduction gear 93 to be used as the assist toque for assisting the steering operation of the driver.

An abnormality detection operation of the control apparatus 1 will be described next. The control unit 70, particularly the microcomputer 77, detects abnormality of the first drive system and the second drive system by execution of a series of abnormality detection processing S100 shown in FIG. 3.

Figure 3:
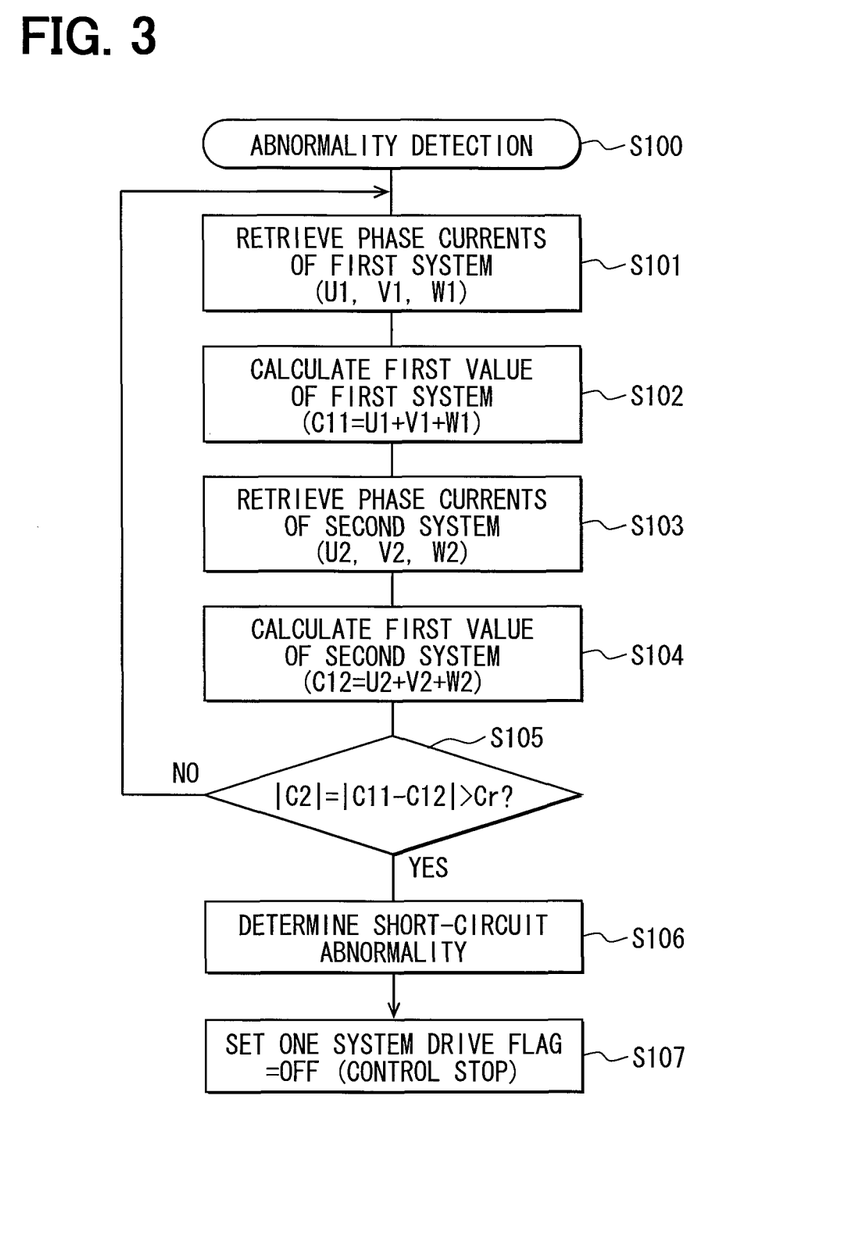
FIG. 3 is a flowchart showing abnormality detection processing executed by the control apparatus according to the first embodiment.

The control unit 70 executes the processing S100 when an ignition key (not shown) of the vehicle is turned on, that is, when the control apparatus 1 is powered. The processing S100 is executed in parallel with other processing executed by the control unit 70 for controlling the driving of the motor 10.

At S101, the control unit 70 retrieves phase currents of the first drive system. That is, the control unit 70 retrieves the U-phase current U1, the V-phase current V1 and the W-phase current W1 of the first drive system detected by the current detection elements 41, 42 and 43, respectively. At S102, the control unit 70 calculates a first value C11, which is a sum of the phase currents U1, V1 and W1 of the first drive system retrieved at S101.

At S103, the control unit 70 retrieves the phase currents of the second drive system. That is, the control unit 70 retrieves the U-phase current U2, the V-phase current V2 and the W-phase current W2 of the second drive system detected by the current detection elements 44, 45 and 46, respectively. At S104, the control unit 70 calculates a first value C12, which is a sum of the phase currents U2, V2 and W2 of the second drive system retrieved at S103.

At S105, the control unit 70 calculates a second value C2, which is a difference (C11-C12) between the first value C11 calculated at S102 and the first value C12 calculated at step S104. The control unit 70 further checks whether an absolute value of the second value C2 is greater than a predetermined reference value Cr. If the absolute value of the second value C2 is greater than the reference value (S105:YES), that is, if the currents flowing in the first drive system and the second drive system differ more than an allowable range (Cr) and are not balanced, the control unit 70 executes S106. If the absolute value of the second value C2 is equal to or less than the reference value (S105:NO), the control unit 70 repeats S101 to S105.

At S106, the control unit 70 determines that a short-circuit abnormality is present between the first drive system including the first inverter circuit 20 and the second drive system including the second inverter circuit 30. The microcomputer 77 in the control unit 70 thus operates as an abnormality detection part, which detects abnormality. At S107, the control unit 70 sets a first system drive flag, for example, to OFF. Thus, the control unit 70 stops the switching control for the first inverter circuit 20. The control unit 70 however continues the switching control for the second inverter circuit 30. Thus the motor 10 is driven by only the second inverter circuit 30.

Figure 4:
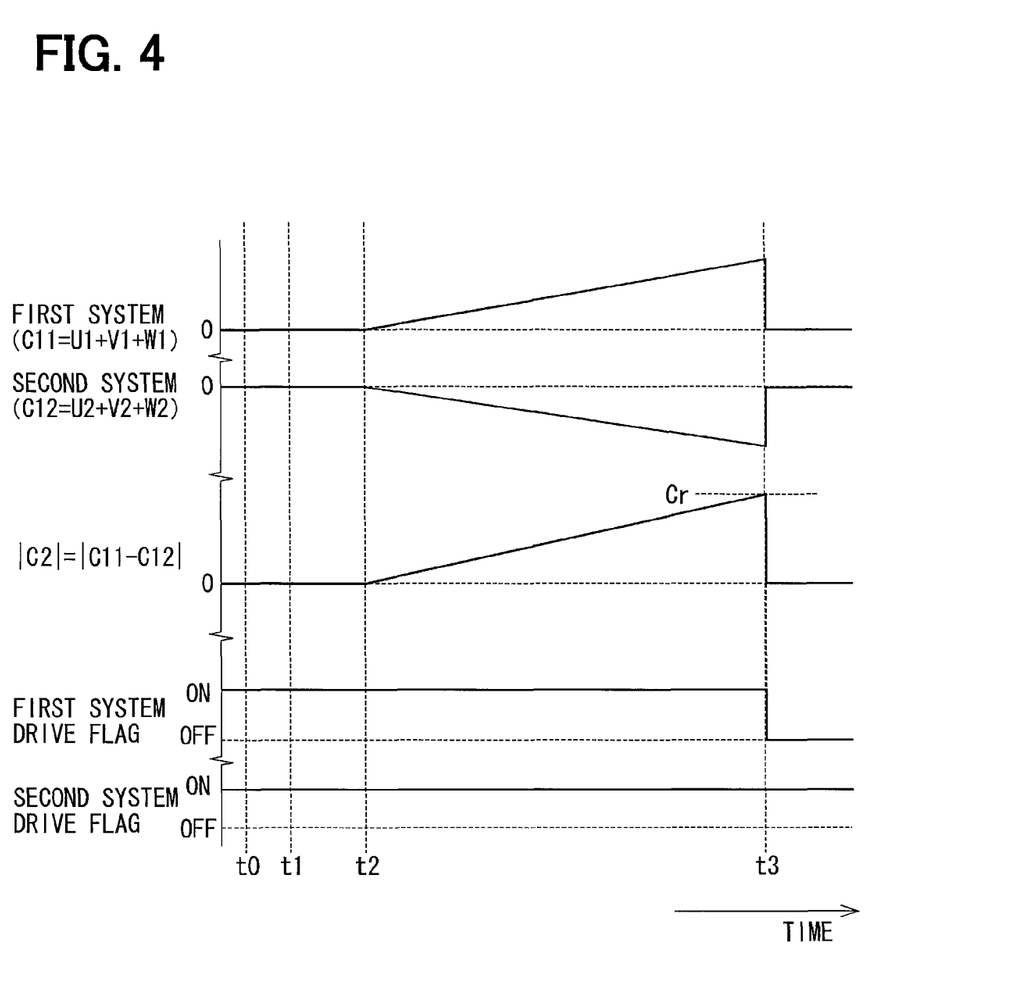
FIG. 4 is a time chart showing an operation of the control apparatus according to the first embodiment.

One exemplary operation of the control apparatus 1 will be described with reference to FIG. 4. At time t0, the drive flags of both the first drive system and the second drive system are ON and the motor 10 is driven by the first inverter circuit 20 and the second inverter circuit 30 to supply the motor 10 with respective currents in a sinusoidal waveform, which varies in positive and negative directions. Thus, the first values C11 and C12 of the phase currents are both 0.

It is assumed that at time t1 a short-circuit abnormality arises between the first drive system and the second drive system, for example as shown by a one-dot chain line in FIG. 1, the U-phase coil 14 connected to the second inverter circuit 30 is short-circuited to the U-phase coil 11 connected to the first inverter circuit 20. As long as the steering speed is slow, the U-phase coil 11 in the first drive system is supplied with a current of a duty ratio between 0% and 50% and the U-phase coil 14 in the second drive system is supplied with a current of a duty ratio between 50% and 100%. The ON period of the high-side FET 31 in the second inverter circuit 30 is therefore longer. Since the low-side FET 24 in the first inverter circuit 20 turns on when the high-side FET 31 of the second inverter circuit 30 turns on, a current flows from the high-side FET 31 of the second inverter circuit 30 into the low-side FET 24 of the first inverter circuit 20 through the U-phase coil 14 of the second winding set 19 and the U-phase coil 11 of the first winding set 18. For this reason, the first value C11 increases in a positive value range after time t2. The first value C12 decreases in a negative value range after time t2. As a result, the absolute value of the second value (C2=C11−C12) increases in the positive value region.

When the second value C2 reaches the reference value Cr at time t3, the drive flag of the first drive system is set to OFF. That is, the switching control of the first inverter circuit 20 by the control unit 70 is stopped. Since the switching control for the first inverter circuit 20 is stopped after time t3, the first value C11 and the first value C12 return to 0. Further, the second value C2 also returns to 0.

(1) As described above, according to the first embodiment, the first inverter circuit 20 and the second inverter circuit 30 are provided for the winding sets (first winding set 18 and second winding set 19), respectively, to switch over power supply to the winding set. That is, a plurality of inverter circuits is provided in correspondence to a plurality of drive systems (first drive system and second drive system). The control unit 70 controls operations of the first inverter circuit 20 and the second inverter circuit 30. The control unit 70, particularly the microcomputer 77, operates as the abnormality detection part and is capable of detecting the abnormality between the first drive system and the second drive system.

The control unit 70 calculates the first values (C11 and C12) with respect to each drive system based on the phase currents of the inverter circuit in each system. The control unit 70 calculates the second value C2 based on the two first values (C11 and C12) selected from the plurality of first values (C11 and C12) calculated for each system. The control unit 70 detects abnormality between the drive systems (first inverter circuit 20 and second inverter circuit 30), which correspond to the inverter circuits, the first values (C11 and C12) of which are selected, when the second value C2 deviates from a predetermined range Cr. As described above, it is possible to detect accurately abnormality of the drive systems based on two values (first value and second value), which are set independently.

(2) More specifically, according to the first embodiment, the first value (C11 and C12) is a sum of the phase currents of each drive system and the second value C2 is a difference (C11-C12) of the two values (C11 and C12) selected from a plurality of first values (C11 and C12) calculated with respect to each drive system. When the second value C2 deviates from the predetermined range Cr, it is determined that a short-circuit abnormality is present between the drive systems including respective first inverter circuit 20 and second inverter circuit 30, which correspond to the selected first values (C11 and C12). The short-circuit abnormality between the first inverter circuit 20 and the second inverter circuit 30 can be detected based on the first value (C11 and C12) and the second value C2.

(3) According to the first embodiment, the second value C2 is an absolute value. The second value C2 is thus limited to be a positive value and the abnormality of the drive systems can be detected efficiently.

(4) According to the first embodiment, the control unit 70, particularly the microcomputer 77, operates as the abnormality detection part. Upon detection of abnormality of the drive systems including the respective first inverter circuit 20 and second inverter circuit 30, the control unit 70 stops the operation of one (first inverter circuit 20 in the present embodiment) of two inverter circuits (first inverter circuit 20 and second inverter circuit 30) corresponding to the selected first calculation value (C11 and C12). Thus, the motor 10 can continuously be driven by the other one (for example, second inverter circuit 30 of the two inverter circuits (first inverter circuit 20 and second inverter circuit 30).

(5) The electric power steering system 99 is provided with the control apparatus 1 according to the first embodiment. Even when the abnormality arises between the first drive system and the second drive system, only one (for example, first inverter circuit 20) of the drive systems is stopped from operating without stopping both drive system from operating. Thus, the motor 10 can be controlled and driven continuously by the other one (for example, the second inverter circuit 30). Thus, even when the short-circuit abnormality arises between the drive systems of the control apparatus 1, the steering operation of the driver can be continuously assisted by the electric power steering system 99.

(Second Embodiment)

Figure 6:
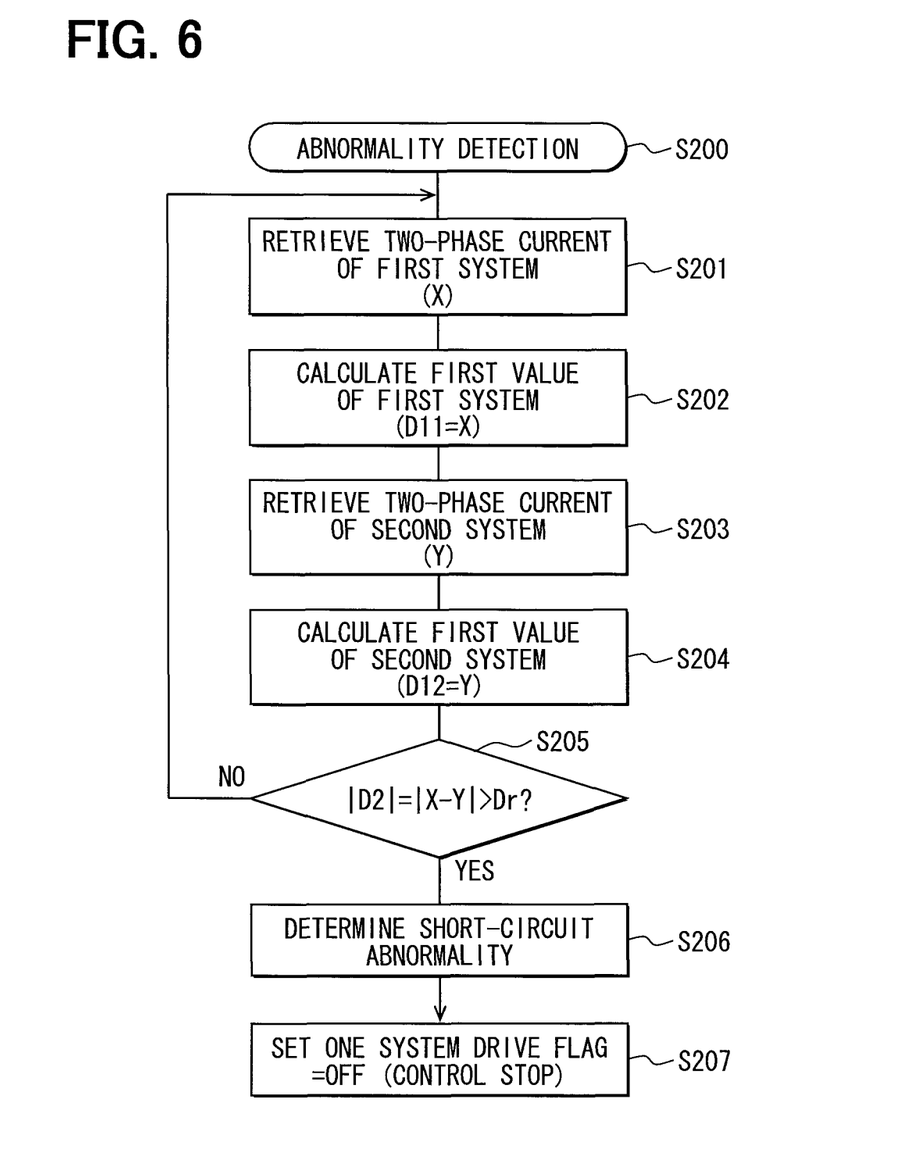
FIG. 6 is a flowchart showing abnormality detection processing executed by the control apparatus according to the second embodiment.
Figure 7:
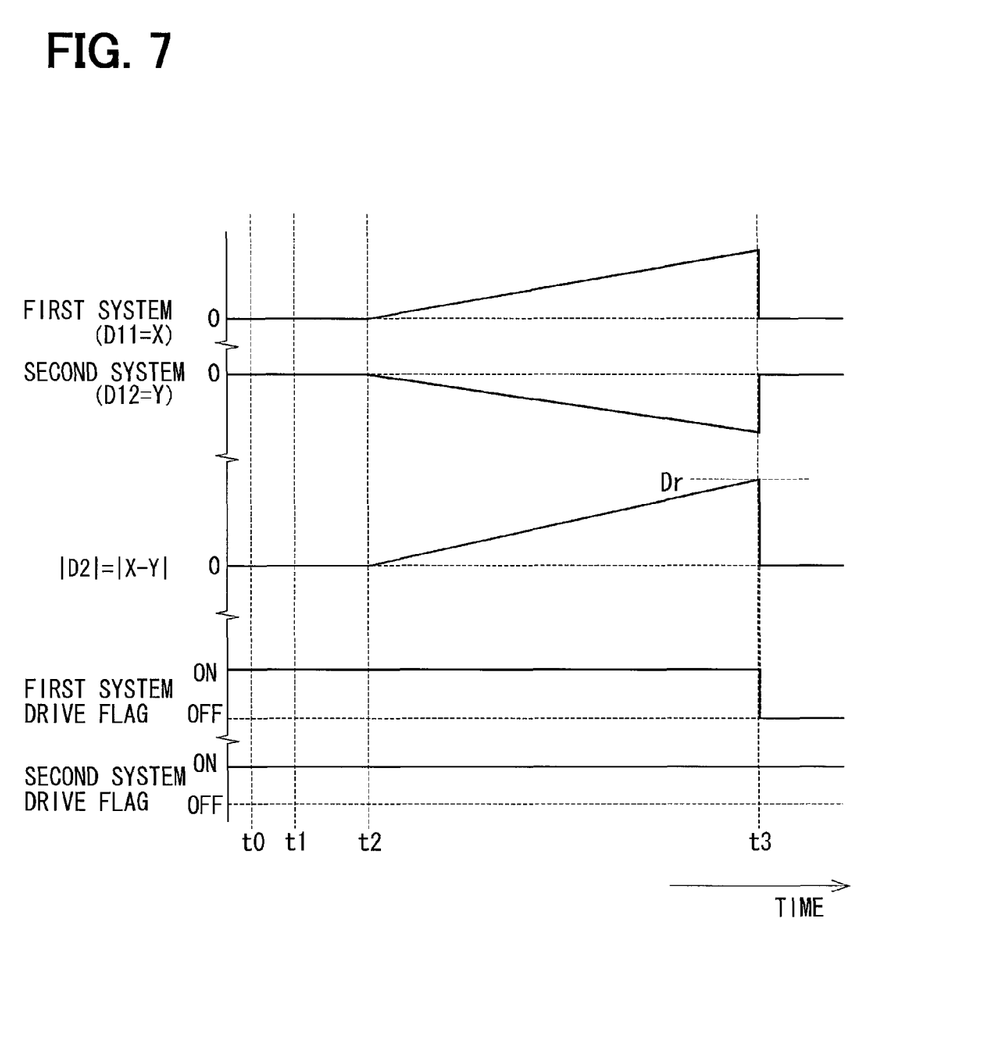
FIG. 7 is a time chart showing an operation of the control apparatus according to the second embodiment.

A control apparatus for a multi-phase rotary machine according to a second embodiment will be described next with reference to FIGS. 5 to 7.

Figure 5:
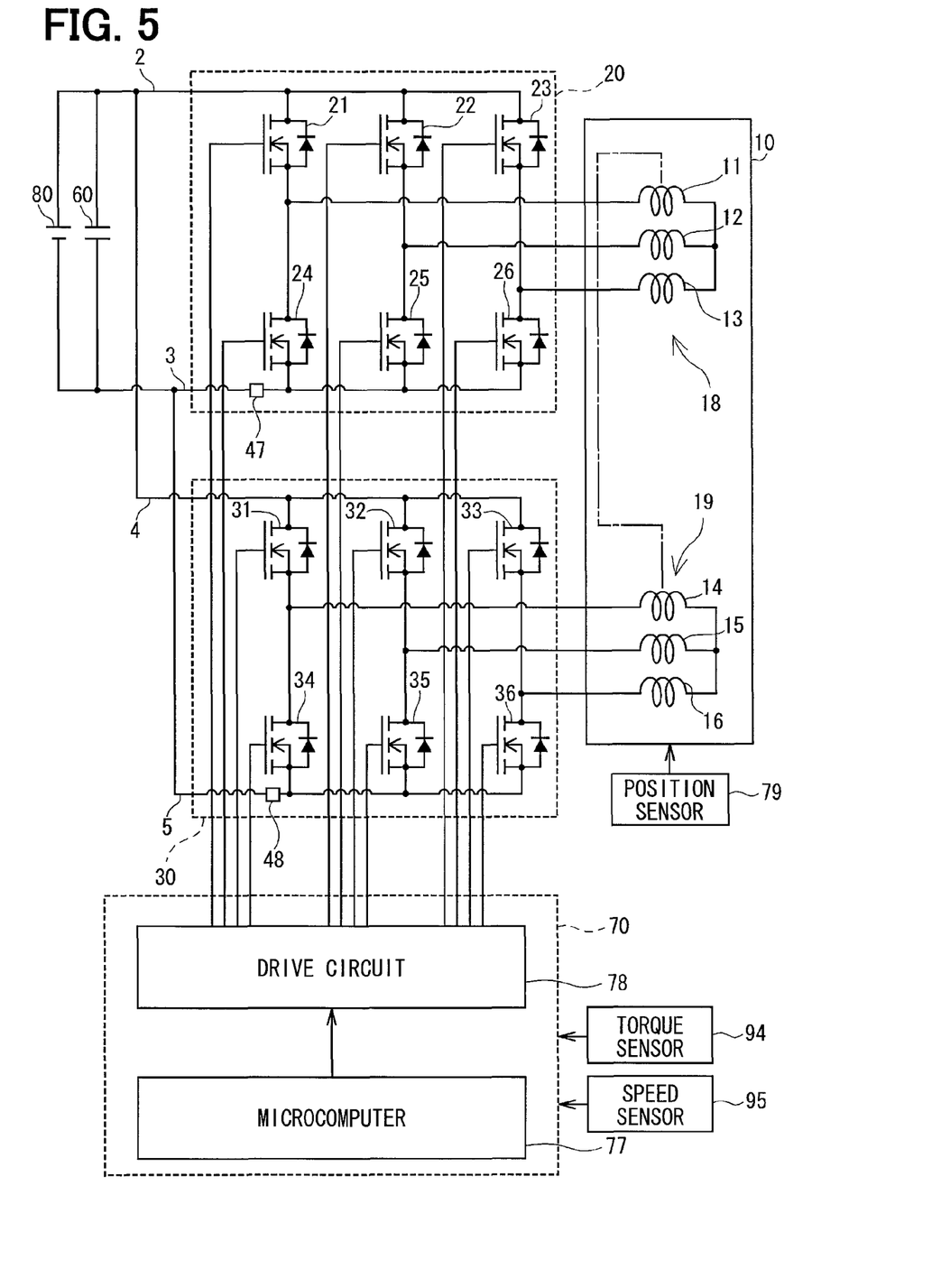
FIG. 5 is a circuit diagram showing a control apparatus for a multi-phase rotary machine according to a second embodiment.

As shown in FIG. 5, a current detection circuit 47 is provided in place of the current detection elements 41 to 43 provided in the first embodiment. Further, a current detection circuit 48 is provided in place of the current detection elements 44 to 46 provided in the first embodiment. The current detection circuit 47 is provided in the low-side power supply bus 3 to detect a two-phase current, which flows in the first drive system. The current detection circuit 48 is provided in the low-side power supply bus 5 to detect a two-phase current, which flows in the second drive system. The two-phase current is a DC current, which corresponds to a superposition of peak values of the three phase currents, for example, U1, V1 and W1 of the first motor drive system.

An abnormality detection operation of the control apparatus according to the second embodiment will be described below. The control unit 70, particularly the microcomputer 77, detects abnormality between the first drive system and the second drive system by execution of a series of processing S200 shown in FIG. 6. The control unit 70 executes the processing S200 when the ignition key of the vehicle is turned on, that is, when the control apparatus is powered. The processing S200 is executed in parallel with other processing executed by the control unit 70 for controlling the driving of the motor 10.

At step 201, the control unit 70 retrieves two-phase current of the first drive system. That is, the control unit 70 retrieves the two-phase current X of the first inverter circuit 20 by the current detection circuit 47. At S202, the control unit 70 calculates the retrieved two-phase current X of the first drive system as a first value D11.

At step 203, the control unit 70 retrieves two-phase current of the second drive system. That is, the control unit 70 retrieves the two-phase current Y of the second inverter circuit 30 by the current detection circuit 48. At S204, the control unit 70 calculates the retrieved two-phase current Y of the second drive system as a first value D12.

At S205, the control unit 70 calculates a second value D2, which is a difference (X Y) between the first value D11 calculated at S202 and the first value D12 calculated at step S204. The control unit 70 further checks whether an absolute value of the second value D2 is greater than a predetermined reference value Dr. If the absolute value of the second value D2 is greater than the reference value (S205:YES), that is, the currents flowing in the first drive system and the second drive system are not balanced, the control unit 70 executes S206. If the absolute value of the second value D2 is equal to or less than the reference value (S205:NO), the control unit 70 repeats S201 to S205.

At S206, the control unit 70 determines that a short-circuit abnormality is present between the first drive system including the first inverter circuit 20 and the second drive system including the second inverter circuit 30. The control unit 70, particularly the microcomputer 77, thus operates as the abnormality detection part. At S207, the control unit 70 sets, for example, a first drive system drive flag to OFF. Thus, the control unit 70 stops the switching control for the first inverter circuit 20, that is, power supply to the first winding set 18 from the first inverter circuit 20. The control unit 70 however continues the switching control for the second inverter circuit 30. Thus the motor 10 is driven by only power supply from the second circuit 30.

One exemplary operation of the control apparatus according to the second embodiment will be described with reference to FIG. 7. At time t0, the drive flags of both the first drive system and the second drive system are ON and the motor 10 is driven by the first inverter circuit 20 and the second inverter circuit 30. It is assumed that at time t1 a short-circuit abnormality arises between the first drive system and the second drive system. The first value D11 increases in a positive value range after time t2. The first value D12 decreases in a negative value range after time t2. As a result, the absolute value of the second value D2=D11−D12 increases in the positive value region.

When the second value D2 reaches the reference value Dr at time t3, the drive flag of the first drive system is set to OFF. That is, the switching control of the first inverter circuit 20 by the control unit 70 is stopped. Since the switching control for the first inverter circuit 20 is stopped after time t3, the first value D11 and the first value D12 return to 0. Further, the second value D2 also returns to 0.

As described above, according to the second embodiment, the first value (D11 or D12) is a two-phase current (X or Y) of each drive system and the second value D2 is a difference (D11-D12) of the two first values (D11 and D12) selected from a plurality of first values (D11 and D12) calculated with respect to each drive system. When the second value D2 deviates from a predetermined range Dr, it is determined that a short-circuit abnormality is present between the drive systems (first inverter circuit 20 and second inverter circuit 30), which correspond to the selected first values (D11 and D12). The short-circuit abnormality between the drive systems can be detected based on the first value (D11 and D12) and the second value D2.

(Other Embodiment)

In the above-described embodiments, as an example, the abnormality between the drive systems is determined when the absolute value of the second value deviates from the predetermined range. However, as other embodiments, the abnormality between the drive systems may be determined when the second value, which is variable to be positive and negative, deviates from a predetermined range.

In the above-described embodiments, as an example, the control unit 70 stops the operation of the first inverter circuit 20, which is the inverter circuit of the first drive system, upon detection of the short-circuit abnormality in the first drive system. However, as other embodiments, the control unit 70 may stop the operation of the second inverter circuit 30, which is the inverter circuit of the second drive system, upon detection of the short-circuit abnormality in the second drive system.

The control apparatus is not limited to a two-phase rotary machine, which is driven by two drive systems (two inverter circuits) but may be implemented as a control apparatus including three or more drive systems. In this modification, the control apparatus calculates, as abnormality detection part, a first value by calculating a sum of phase currents or a two-phase current with respect to each system, calculates a second value based on two values selected from a plurality of the first values, and determines an abnormality of an inverter circuit corresponding to the selected first value.

The control apparatus is not limited to application to the multi-phase rotary machine of the electric power steering system but may be applied to other control apparatuses for a multi-phase rotary machine used for other systems.

What is claimed is:

1. A control apparatus for controlling driving of a multi-phase rotary machine including a plurality of winding sets, each of which is formed of coils corresponding to a plurality of phases, the control apparatus comprising:
   a plurality of inverter circuits provided for the plurality of winding sets, respectively, to jointly form a plurality of drive systems, the plurality of inverter circuits switching over power supply to the winding sets; and
   a control unit for controlling an operation of the inverter circuits, and including an abnormality detection part capable of detecting abnormality of the inverter circuits,
   wherein the abnormality detection part is configured to:
   (1) calculate a first value with respect to each inverter circuit based on phase currents of each inverter circuit,
   (2) calculate a second value based on two first values selected from a plurality of first values calculated in correspondence to the plurality of inverter circuits, respectively; and
   (3) detect abnormality of a short-circuit between the drive systems, which correspond to selected first values, when the second value deviates from a predetermined range.

2. The control apparatus for a multi-phase rotary machine according to claim 1,
   wherein the abnormality detection part is configured to:
   calculate the first value as a sum of the phase current of each inverter circuit; and
   calculate the second value as a difference between two values selected from a plurality of the first values calculated with respect to the plurality of inverter circuits.

3. The control apparatus for a multi-phase rotary machine according to claim 1,
   wherein the abnormality detection part is configured to:
   calculate the first value as a two-phase current of each inverter circuit; and
   calculate the second value as a difference between two values selected from a plurality of the first values calculated with respect to the plurality of inverter circuit.

4. The control apparatus for a multi-phase rotary machine according to claim 1,
   wherein the abnormality detection part is configured to calculate as the second value an absolute value of the difference between the first values.

5. The control apparatus for a multi-phase rotary machine according to claim 1,
   wherein the abnormality detection part is configured to stop an operation of one of two inverter circuits, which correspond to the first values selected for calculation of the second value, when the abnormality detection part determines the abnormality between the drive systems.

6. An electric power steering system for a vehicle comprising:
   the control apparatus according to claim 1; and a multi-phase rotary machine for generating assist torque applied to assist a steering operation of a vehicle.

* * * * *